United States Patent
Bergel

(10) Patent No.: US 7,065,131 B2
(45) Date of Patent: Jun. 20, 2006

(54) PROCESSOR AND METHOD FOR WEIGHT DETECTION IN A CLOSED LOOP DIVERSITY MODE WCDMA SYSTEM

(75) Inventor: Itzhak Bergel, Givat-Shmuel (IL)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 10/066,274

(22) Filed: Jan. 31, 2002

(65) Prior Publication Data

US 2003/0142731 A1    Jul. 31, 2003

(51) Int. Cl.
*H04K 1/00* (2006.01)
*H04B 15/00* (2006.01)

(52) U.S. Cl. .................. 375/152; 375/148; 375/147; 375/149; 375/349; 455/101; 455/276.1

(58) Field of Classification Search ............... 375/152, 375/147–148, 229, 262, 265, 340, 149, 130, 375/349, 341; 370/320, 334–335, 342, 318, 370/479; 455/101, 522, 276.1, 276.3; 714/792, 714/794–796
See application file for complete search history.

(56) References Cited

U.S. PATENT DOCUMENTS 6,754,473 B1 *  6/2004  Choi et al. ................. 455/101
6,831,943 B1 * 12/2004  Dabak et al. ............... 375/147
6,853,839 B1 *  2/2005  Usuda et al. ............ 455/276.1

OTHER PUBLICATIONS

Hou, W S., et al., "Adaptive Detection in Asynchronous Code-Division Multiple-Access System in Multipath Reading Channels", *IEEE Transactions on Communications, 48*, IEEE Inc. NY, US, (May 2000), 863-874.

* cited by examiner

*Primary Examiner*—Khai Tran
*Assistant Examiner*—Edith Chang
(74) *Attorney, Agent, or Firm*—Schwegman, Lundberg, Woessner & Kluth, P.A.

(57) ABSTRACT

A receiver and method for weight detection use received channel estimations and prior feedback information sent to a transmitter to estimate channel weights. The estimated channel weights may have been used by a base station to transmit diversity mode signals. In one embodiment, a trellis algorithm may be used to determine weights with no significant time-slot delay. The weights may be used to generate channel taps for use by a rake receiver in combining multipath components of received signals. In one embodiment, the receiver and method for weight detection may be suitable for use in closed loop diversity mode communication systems, including a Wideband Code Division Multiple Access (WCDMA) system.

29 Claims, 3 Drawing Sheets

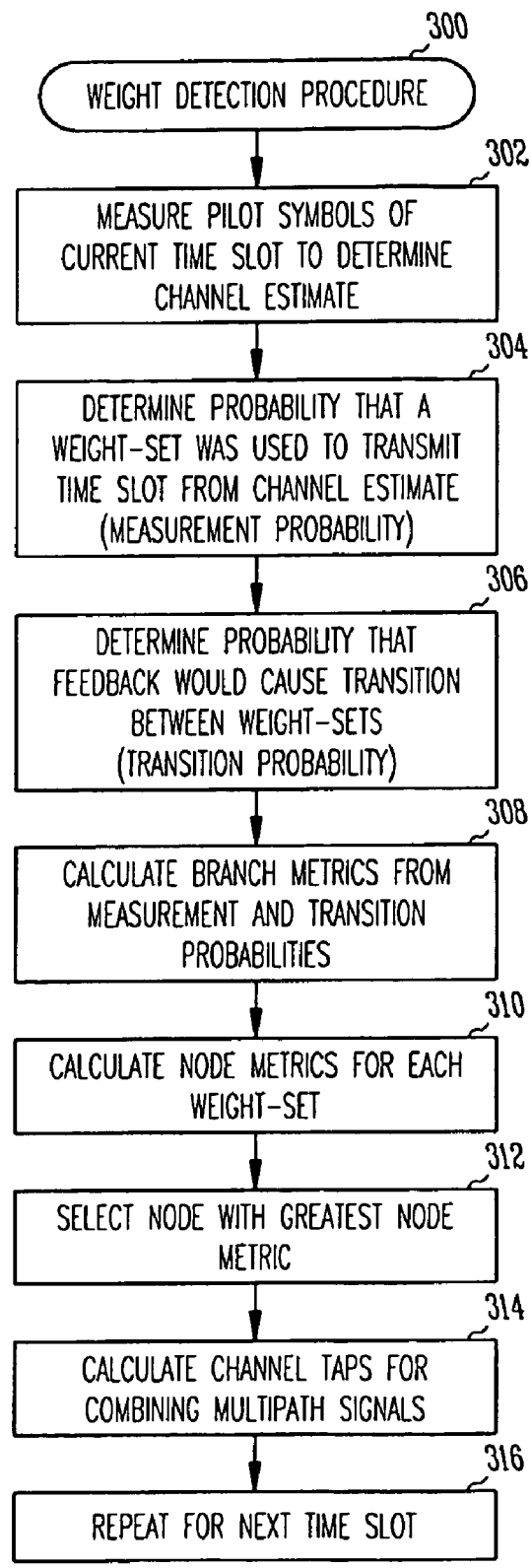

PROCESSOR AND METHOD FOR WEIGHT DETECTION IN A CLOSED LOOP DIVERSITY MODE WCDMA SYSTEM

FIELD OF THE INVENTION

The present invention pertains to processing spread spectrum signals, and in particular, weight detection for processing CDMA signals in a rake receiver.

BACKGROUND OF THE INVENTION

Code division multiple access (CDMA), and particularly direct sequence CDMA, is a technique for spread-spectrum digital communications used for many applications, including, for example, mobile communications. In direct sequence CDMA, data signals are combined with a spreading waveform in the form of a pseudo-random-noise code to form a coded signal for transmission. The code has a frequency (i.e., the chip rate) which may be a multiple of the frequency (i.e., the bit-rate or symbol-rate) of the data signal, so that an effect of combining the data signal and the spreading waveform is that the bit period is divided into smaller chip periods. At the receiver, the signal is combined with the same spreading code to extract the data signal. The technique provides high data capacity by spreading signal energy over a wide bandwidth to increase bandwidth utilization and reduce the effects of narrow-band interference. In direct sequence CDMA, the spreading code of the transmitter and receiver should be synchronized within as little as one chip period to achieve reliable communication. Multipath effects make synchronization more difficult since the wireless channel from a base station to a reception device may have several paths of different channel characteristics which may vary due to the movement of the reception device.

In some CDMA systems, such as a wideband CDMA (WCDMA) system and a WCDMA third generation partnership project (3GPP) system, a closed loop diversity mode may be implemented in which a base station uses two or more antennas to transmit to a mobile receiver. To improve reception of the CDMA signals, a feedback mechanism has been employed by the mobile receiver. The receiver may send the transmitter feedback bits to indicate to the transmitter to adjust or change the phase and/or amplitude components of the diversity mode signals. This feedback mechanism allows the transmitter to select weights suited to the condition and propagation characteristics of the channel between the base station and the mobile receiver. This also allows the mobile receiver to utilize the known weights in combining the multipath components of the received signal. In this way received power can be maximized. One problem, however, is that the feedback channel is not always reliable so that the weights used by the base station may be different than what the mobile receiver is expecting. This mismatch between weighs results in a reduction in performance. Unfortunately, there is no way for the mobile receiver to know when the transmitter does not receive the feedback information.

Thus there is a need for an improved receiver and method for weight detection. There is also a need for a receiver and method for weight detection suitable for use in closed loop diversity mode communication systems, including WCDMA systems.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

FIG. 3 is a flow chart of a weight detection procedure in accordance with an embodiment of the present invention.

DETAILED DESCRIPTION

Figure 1:
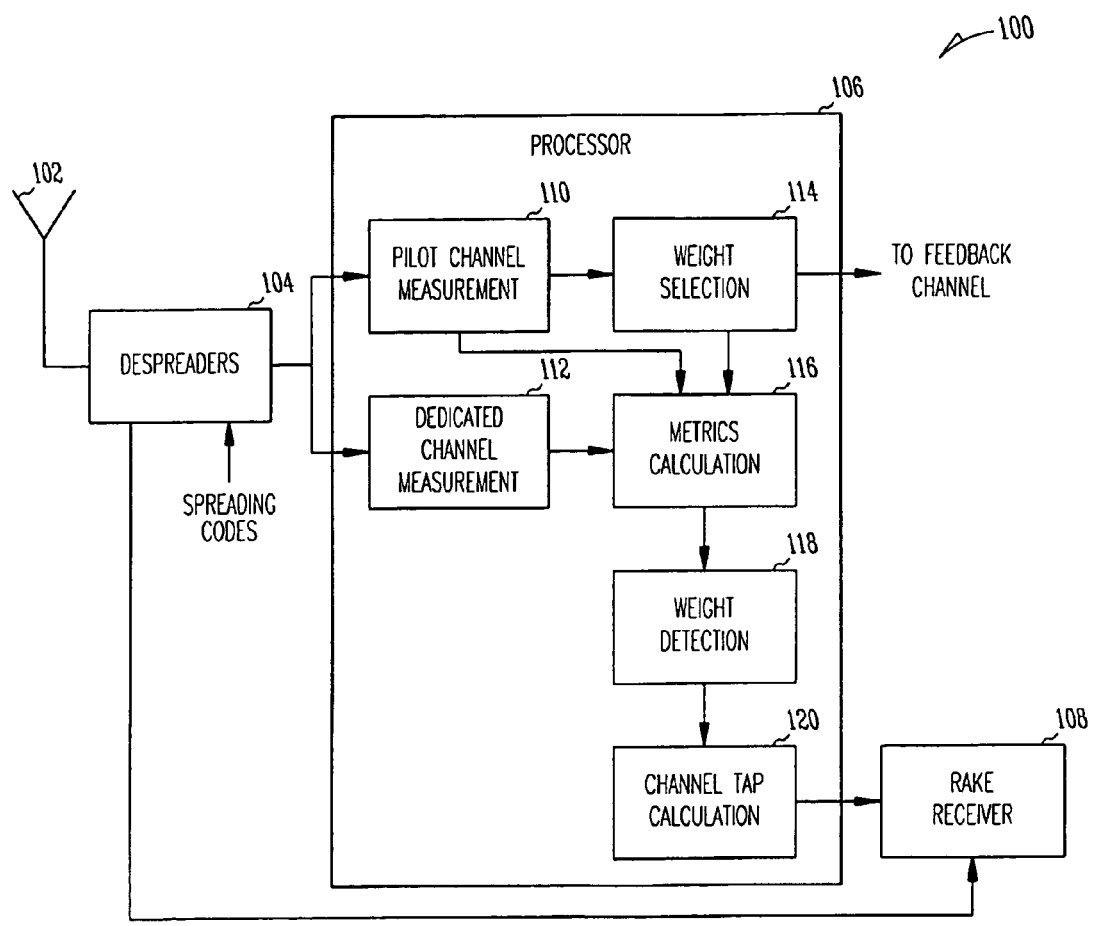
FIG. 1 is a functional block diagram of a portion of a receiver in accordance with an embodiment of the present invention.

The description set out herein illustrates the various embodiments of the invention and such description is not intended to be construed as limiting in any manner. FIG. 1 is a functional block diagram of a portion of a receiver in accordance with an embodiment of the present invention. Receiver 100 may be part of a one-way or two-way communication device, such as, for example, a wireless telephone, a two-way radio, or a receiver that is part of end user equipment. Receiver 100, among other things, despreads spread-spectrum signals. In a WCDMA embodiment, receiver 100, among other things, despreads dedicated physical channels. WCDMA may apply a two-layered code structure that includes an orthogonal spreading code and pseudo-random scrambling codes. Spreading is performed using channelization codes which transform a data symbol into a number of chips which increase the bandwidth of the signal to create a spread-spectrum signal. Orthogonality between the different spreading codes may be achieved by tree-structured orthogonal codes. Spreading codes for example, may include Gold codes, Walsh codes, Hadamard codes, orthogonal variable spreading factor (OVSF) channelization codes and/or other sequences. Scrambling codes may be used, for example, for cell separation in the downlink and user separation in the uplink. Receiver 100 may be suitable for, among other things, receipt of spread-spectrum signals including, for example, WCDMA signals, IS-95 CDMA signals, and other direct sequence CDMA signals.

Physical channels have a spreading factor which corresponds with a bit-rate and are made up of radio frames and time-slots. In accordance with a WCDMA embodiment of the present invention, the length of a frame, for example, may be 10 ms and a frame may include, for example, 15 time-slots. Each time-slot has fields containing bits. The number of bits per time-slot may depend on the spreading factor and the slot format of the physical channel.

Receiver 100 includes antenna 102 to receive spread spectrum signals and despreaders 104 to despread the received spread spectrum signals with appropriate spreading codes. The spreading codes may be supplied by processor 106 of receiver 100. Receiver 100 also includes rake receiver 108 to weigh and combine the multipath components of the received signals with weights provided by processor 106. Processor 106 includes several functional elements, some of which are illustrated in FIG. 1. Software may be used to configure processor 106 to implement these functional elements. Functional elements of processor 106 may include pilot channel measurement element 110, dedicated channel measurement element 112, weight selection element 114, metrics calculation element 116, weight detection element 118 and channel tap calculation element 120, although the scope of the present invention is not limited in this respect. In alternative embodiments, functional elements of processor 106 may include hardware and/or elements for performing similar functions. Processor 106 may be a digital signal processor (DSP) configured with software.

In a WCDMA embodiment, pilot channel measurement element 110 may measure characteristics of a received pilot channel. Weight selection element 114 determines appropriate channel weight-sets from a group of predetermined channel weight-sets to be used by the transmitter based at least on pilot channel measurements. Weight selection element 114 may generate feedback, such as one or more feedback bits, to transmit back to the transmitting base station which may be used by the transmitting base station in transmitting signals to receiver 100. The feedback may instruct the transmitting base station to select a particular weight-set to use in transmitting a subsequent time-slot. The feedback may also instruct the base station how to change characteristics such as, for example, phase and amplitude, of a subsequent time-slot of the dedicated channel being transmitted in a diversity mode to receiver 100.

Dedicated channel measurement element 112 measures characteristics of a time-slot of a channel to determine a channel estimation. In a WCDMA embodiment, dedicated channel measurement element 112 may measure pilot symbols of a current time-slot of a dedicated physical channel (DPCH) to determine the current channel estimation. The characteristics measured may include, for example, phase and amplitude of the received diversity mode signals.

Metrics calculation element 116 calculates metrics for each weight-set that may have been used in transmitting the time-slot of the channel. In one embodiment, there may be up to sixteen or more weight-sets that may have been used in transmitting the diversity signals for the current time-slot. In this embodiment, metrics are calculated for each of these predetermined weight-sets. Metrics calculation element 116 may use a trellis algorithm to calculate metrics for the weight-sets, and may base these metrics on a measurement probability, a transition probability and a prior metric for a weight-set. The measurement probability may be the probability that a base station used a set of weights to transmit the current time-slot based at least on the channel estimation from element 112. The transition probability may be a probability that a weight-set was changed from a prior weight-set to another weight-set in transmitting the timeslot. The transition probability is based at least on a prior weight selection by element 114. The prior metric for the weight-set may be the metric associated with a prior weight-set coupled by a branch in the trellis. The transition probability, measurement probability and prior metric may be combined to determine metrics for each weight-set for the current time-slot. This is explained in more detail below.

Weight detection element 118 selects the weight-set having the greatest metric and supplies it to channel tap calculation element 120 for use in generation channel taps for use by rake receiver 108.

In at least one embodiment, receiver 100 may be suitable for operating in accordance with a WCDMA 3GPP standards system that implements a closed-loop diversity mode in which the base station transmits using two or more antennas and the phase and amplitude difference between the antennas may be determined, at least in part, by feedback provided by a mobile receiver over a feedback channel. In these embodiments, receiver 100 may implement, among other things, two processes related to weight selection. The first process, which is performed by weight selection element 114, selects a weight-set for use by the base station in transmitting a time-slot of a channel and is provided through a feedback channel.

The second process, which is performed by elements 112, 116, 118, and 120, addresses the reliability problem of the feedback channel and is used to detect the weights that may have actually been used by the base station in transmitting a current time-slot. This process may be based at least on a channel estimations derived from pilot symbols of a dedicated channel and a pilot channel such as the continuous pilot channel (CPICH). This process may also utilize the weights selected by the receiver in the first process. Because the weights may change for each time-slot, the receiver may estimate the weights for every timeslot. In this embodiment, the channel estimations are used to generate a metric that reflect the probability that a certain weight-set was actually used in transmitting a time-slot of a channel. This metric, referred to as a measurement probability, depends on the channel estimations of the current time-slot tested for each of the weight-sets that could have been used, and does not depend on the feedback information provided to the transmitter.

Because the actual weight-set used may have been affected by the feedback channel over a period of a few time-slots, the feedback generated at each time-slot has an effect that may last over several subsequent time-slots. The present invention, in at least one embodiment, implements a smart detection of the weight-set used by the transmitter for the current time-slot using, among other things, information from prior time-slots. A trellis algorithm, for example, is one algorithm that may be used. One problem with a conventional trellis algorithm is the delay associated with the evaluation of information over several time-slots. This convention approach typically requires storing in memory a large amount of data for these time-slots which makes it less desirable for mobile communication devices. The present invention, in at least one embodiment, may use a trellis algorithm with no significant delay. History information from previous time-slots is collected and a decision is made at each time-slot according to a highest node metric. Accordingly, decisions may be made without substantial delay and may be based at least on current time-slot measurements and history of prior time-slots. Furthermore, the trellis algorithm includes an ability to detect errors in prior weight detection and change subsequent weight detection to reduce the effect of such an error.

Figure 2:
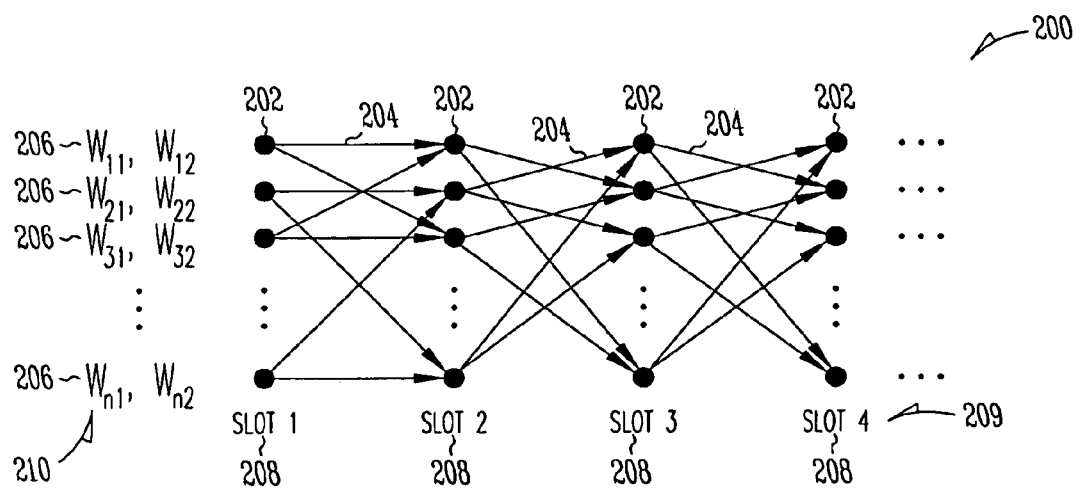
FIG. 2 illustrates a trellis for use in weigh set detection in accordance with an embodiment of the present invention.

FIG. 2 illustrates a trellis for use in weigh set detection in accordance with an embodiment of the present invention. Trellis 200 may be used to help visualize the operation a trellis algorithm used in the calculation of metrics and weight-set detection for a receiver portion, such as receiver 100. Each node 202 of trellis 200 corresponds with one time-slot 208 in sequence of time-slots 209 and one weight-set 206 of group of predetermined weight-sets 210. Branches 204 couple one node of a prior time-slot with more than one node of the next time-slot. Each row of nodes is associated with a particular one of the weight-sets, and each column is associated with one particular time-slot. Each node 202 may have a node metric associated therewith, and each branch 204 may have a branch metric associated therewith. The branch metrics may be calculated from the measurement probability and the transition probability. A node metric is the highest of the metrics selected from the combination of a branch metric of a branch to the node with the node metric of the prior node which is coupled by the particular branch. For example, a node metric may be calculated by adding a branch metric to the prior node metric. Because there is more than one branch to a node, several node metrics may be calculated, however the highest of the several node metrics is selected as the node metric for a particular node. The weight-set corresponding with the node that has the highest of all node metrics for the nodes associated with a particular time-slot may be used to generate channel taps for the rake receiver for that time-slot.

As can be seen, a history from prior time-slots is used in detecting weights for a current time-slot, along with current measurements. When a node for a timeslot is selected that has no branch to a node selected to the prior time-slot, the algorithm may have detected an error in the previously chosen weights. Since there isn't much delay, the error is not corrected, however a wiser decision is made with the current information.

Trellis 200 illustrates an embodiment having two branches between a node of a prior time-slot and nodes of a next time-slot. In this embodiment, the feedback bandwidth may restrict a transition to a predetermined number of weight-sets for a particular prior weight-set. System requirements and transmitter restraints may also determine these restrictions. In this embodiment, there may be a limited number of weight-sets that a transmitter may use for a next time slot which are reflected by the branches in the trellis. Other embodiments may include more than two such branches.

The trellis algorithm which may be implemented by one or more embodiments of the present invention differs from convention trellis algorithms in several aspects. For example, unlike a conventional trellis algorithm, a metric associated with the resulting node is utilized rather than transitions between nodes. Additionally, unlike convention trellis algorithms, once the metrics for a particular time-slot are calculated, a decision for that time-slot may be made and therefore there is virtually no delay. Furthermore, unlike conventional trellis algorithms, when a path through the trellis does not result in a node having the highest metric for a particular time-slot, the trellis algorithm of the present invention allows the start of a new path through the trellis by selecting the node having the highest metric for the time-slot. Accordingly, an error in weight detection may be corrected when there is enough energy to detect it. The impact of the error in weight detection is significantly reduced and does not continue further through the trellis. Unlike a convention trellis algorithm, because the path through the trellis is not used, there is no reason to reconstruct the path when an error in weight estimation is made. Other embodiments of the present invention may utilize a more conventional trellis algorithm having more delay.

FIG. 3 is a flow chart of a weight detection procedure in accordance with an embodiment of the present invention. Although the individual operations of procedure 300 are illustrated and described as separate operations, it should be noted that one or more of the individual operations may be performed concurrently. Further, nothing necessarily requires that the operations be performed in the order illustrated.

Procedure 300 detects a weight-set to use for combining multipath signals in a rake receiver. After the signals have been despread, the weights of the selected weight-set may be used in the rake receiver to calculate channel taps for a current time-slot. Procedure 300 may increase the probability of detecting the same weight-set used by the base station in transmitting the current time-slot. Each weight of a weight-set, for example, may have a phase and magnitude component, and each weight-set may have at least two weights. The weight-sets may correspond with the diversity mode signals transmitted by a base station. Although procedure 300 is described for weight-sets having two weights, procedure 300 is equally applicable to more than two weight-sets, for example, when a base station transmits more than two diversity mode signals. In one embodiment, procedure 300 may utilize a trellis algorithm to help select a weight-set from a group of predetermined weight-sets.

Operation 302 measures characteristics of a current time-slot of a channel to determine current channel estimations. In a WCDMA embodiment, operation 302 may measure pilot symbols of a current time-slot of a dedicated physical channel (DPCH) and a pilot channel such as the continuous pilot channel (CPICH) to determine the current channel estimations. The characteristics measured may include, for example, phase and amplitude of the received diversity mode signals.

Operation 304 determines a probability that a base station used a set of weights to transmit the measured time-slot based at least on the channel estimations of operation 302. For example, a base station may have used one of a predetermined number of weight-sets to transmit a time-slot of channel in diversity mode. In a WCDMA embodiment, a base station may use one of sixteen weight-sets for time-slot transmission. Operation 304 may calculate this probability for the predetermined weight-sets based at least on the channel estimations from operation 302. In other words, operation 304 generates a probability that a particular weight-set may have been actually used in transmitting symbols received during the time-slot. The probability determined in operation 304 may be referred to as a measurement probability. Each weight-set may be represented by rows of nodes on a trellis and time-slots may be represented as columns of nodes on the trellis.

Operation 306 determines a probability that a weight-set was changed from a prior weight-set to a current weight-set in transmitting the current timeslot. This probability, may be referred to as a transition probability, and may be based at least on previous feedback (e.g., one or more feedback bits) from the receiver to the transmitter. In an embodiment where a base station may have a predetermined number of weight-sets to use for transmitting the time-slot, operation 306 determines a probability of a transition for each weight-set. In one embodiment of the present invention, the receiver may have provided feedback to the transmitting base station to indicate to the base station to change the weight-set for transmitting subsequent time-slots. In this embodiment, the transmitter may be restricted to certain weight-sets based at least on the previously used weight-set. In other words, a weight-set used in transmitting a prior time-slot may restrict the weight-set options that have been used for transmitting the currently received time-slot. For example, the probability may be high that the transmitter actually used the weight-set requested by the receiver in response to the feedback, however, due to unreliability in the feedback channel, the transmitter may have not properly received the feedback from the receiver and the receiver can not be sure of what weight-set the transmitter actually used. For example, due to poor channel conditions, the transmitter may have not received the feedback that was actually sent by the receiver. Accordingly, it is possible that the transmitter may have used another weight-set other than the weight-set requested by the receiver to transmit the time-slot. Operation 306 calculates the probability for the use of each weight-set based at least on the restrictions for transitions between weight-sets and the feedback that had been sent to the transmitter.

When weight-sets are represented as rows on a trellis and time-slots are represented as columns of the trellis, restrictions on changes to the weight-set between subsequent time-slots restricts branches of the trellis between one node to certain nodes of a next time-slot. In other words, because of the restriction on changes to the weight-set between time-slots, branches from each node may exist only to certain nodes of a subsequent time-slot. For example in FIG. 2, two branches are illustrated between a node of a prior time-slot and nodes of subsequent time-slot meaning that, in this example, the feedback bandwidth may restrict a transition to certain two weight-sets for a particular prior weight-set. System requirements and transmitter restraints may also determine these restrictions. In this embodiment, there may be a limited number of weight-sets that a transmitter may use for a next time slot. Procedure 300, however, is equally applicable to having two or more branches to nodes of subsequent time-slots.

Operation 308 combines the transition probability and the measurement probability to determine metrics for transitions to each weight-set of a current time-slot. When a trellis is used, these metrics may be referred to as branch metrics. In this embodiment, operation 308 calculates the branch metrics for branches between the nodes of the trellis representing the prior time-slot and nodes representing the current time-slot. In operation 308, the probabilities from operations 304 and 306 are combined to determine a branch metric for each branch between certain prior nodes and the nodes of the set representing the current time-slot. The branch metric may be calculated by the sum of the logarithms of the transition probability and the measurement probability.

Operation 310 calculates a weight-set metric for each of the possible weight-sets for the current time-slot. When a trellis is used, operation 310 calculates a node metric for each node of the node set of the trellis representing the current time-slot. In operation 310, the node metric is based at least on one of the branch metrics of a connecting branch and a node metric of the prior node connected by the connecting branch. Because there may be two or more branches coupling the nodes of the current node set with previous nodes, two or more node metrics may be calculated for each node, however operation 310 may also select the node metric having the greatest value as the node metric for a particular node. At the completion of operation 310, each of the possible weight-sets have a metric associated therewith. The metrics include both measurement information (e.g., operation 304) and transition information (e.g., operation 306).

Operation 312 selects the weight-set for the current time-slot having the highest metric. When a trellis is used, operation 312 selects the node with the greatest node metric to identify a corresponding weight-set. Operation 314 may use the weight-set identified in operation 312 for processing the current time-slot of a channel. For example, operation 314 may use the weight-set to determine appropriate channel taps for use in combining the multipath components of the signals in a rake receiver. The weight-set selected may be used for processing the current time-slot. Operation 316 may repeat the operations of procedure 300 for the next time-slot of a received channel.

Thus, a receiver and method of determining weights for combining signals in a receiver has been described. In one embodiment, an improved receiver and method for weight detection is provided. In another embodiment, a receiver and method for weight detection is suitable for use in closed loop diversity mode communication systems, including, for example, Wideband Code Division Multiple Access (WCDMA) systems. In another embodiment, a receiver and method for weight detection use channel estimations and prior feedback information sent to a transmitter to estimate the weights used by the base station. A trellis algorithm may be used to determine weights with no substantial time-slot delay. The weights may be used to generate channel taps for use by a rake receiver in combining multipath components of received signals.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method to detect a final weight-set to process a spread spectrum channel comprising:
    determining a measurement probability for an initial weight-set from a group of predetermined weight-sets from measurements of a current time-slot;
    determining a transition probability for the initial weight-set, the transition probability based at least on a change from a previously requested weight-set;
    calculating a weight-set metric for the initial weight-set based at least on the measurement probability, the transition probability and a prior weight-set metric; and
    detecting the final weight-set from the group of predetermined weight-sets based at least on the weight-set metric to process the current time-slot.

2. The method of claim 1 further comprising using the detected final weight-set to combine multipath components of the current time-slot.

3. The method of claim 1 wherein the weight-set metric is a weight-set metric for a current node of a trellis of nodes, and wherein calculating the weight-set metric comprises:
    calculating, for branches of the trellis leading to the current node, a branch metric based at least on the measurement probability and the transition probability;
    calculating node metrics for the current node based at least on the branch metric of a branch leading to the current node and a metric of a prior node connected by the branch leading to the current node; and
    selecting a greatest of the node metrics for the current node to correspond with the weight-set metric for the current node.

4. The method of claim 3 wherein the group of predetermined weight-sets corresponds to nodes of the trellis.

5. The method of claim 3 wherein the selecting comprises selecting a node from a plurality of nodes of the trellis having the greatest weight-set metric, each node of the plurality corresponding with one weight-set of the group of predetermined weight-sets.

6. The method of claim 1 wherein prior to the determining the measurement probability, the method comprises selecting the initial weight-set from the group of predetermined weight sets, and
    wherein the measurement probability is determined for each weight-set of the group of predetermined weight-sets based at least on received amplitude and phase measurements of the current time-slot.

7. The method of claim 1 wherein the determining the measurement probability for the initial weight-set further comprises estimating a probability for each weight-set of the group of predetermined weight-sets for the current time-slot by measuring received pilot symbols of a dedicated physical channel (DPCH) and a continuous pilot channel (CPICH) of the current time-slot.

8. The method of claim 1 wherein the group of predetermined weight-sets include at least one of the weight-sets used by a base station in transmitting the current time-slot in diversity mode.

9. The method of claim 1 wherein the transition probability is determined from a probability that a the initial weight-set was changed from other weight-sets of the group of predetermined weight-sets and based at least on feedback previously provided by a receiver to a transmitter.

10. The method of claim 9 wherein the feedback is comprised of at least one feedback bit previously transmitted by a mobile unit for use by a base station in transmitting the current time-slot.

11. The method of claim 1 further comprising determining channel taps from the final weight-set for use in combining multipath components of a channel during the current time-slot.

12. The method of claim 1 wherein the initial weight-set and the final weight-set comprise weights, each weight having a phase and amplitude component.

13. The method of claim 1 further comprising repeating the determining of the measurement probability and the transition probability, calculating the weight-set metric and detecting the final weight-set for a next time-slot, wherein the determining of the transition probability uses the weight-set metrics from the current time-slot as a prior time-slot in the next time-slot.

14. A processor comprising:
a weight selection element to select an initial weight-set from a group of predetermined weight sets;
a metrics calculation element to determine a measurement probability for a the initial weight-set from measurements of a current time-slot, to determine a transition probability for the initial weight-set, the transition probability based at least on a change from a previously requested weight-set, and to calculate a weight-set metric for the initial weight-set based at least on the measurement probability, the transition probability and a prior weight-set metric; and
a weight detection element to select a final weight-set from the group of predetermined weight-sets based at least on the weight-set metric to process the current time-slot.

15. The processor of claim 14 wherein the weight-set metric is a weight-set metric for a current node of a trellis of nodes,
wherein the metrics calculation element calculates for branches of the trellis leading to the current node, a branch metric based at least on the measurement probability and the transition probabilitys,
wherein the metrics calculation element further calculates node metrics for the current node based at least on the branch metric of a branch leading to the current node and a metric of a prior node connected by the branch leading to the current node, and
wherein the weight detection element selects a greatest of the node metrics for the current node to correspond with the weight-set metric for the current node.

16. The processor of claim 14 wherein the metrics calculation element determines the measurement probability for each weight-set of the group of predetermined weight-sets based at least on received amplitude and phase measurements of the current time-slot.

17. The processor of claim 14 wherein the metrics calculation element determines the measurement probability by estimating a probability for each weight-set of the group of predetermined weight-sets for the current time-slot by measuring received pilot symbols of a dedicated physical channel (DPCH) and a continuous pilot channel (CPICH) of the current time-slot.

18. The processor of claim 14 wherein the metrics calculation element determines the transition probability from a probability that the initial weight-set was changed from other weight-sets of the group of predetermined weight-sets and based at least on feedback previously provided by a receiver to a transmitter.

19. A machine readable medium having program instructions stored thereon for processing spread spectrum channels when executed within a digital processing device by:
selecting an initial weight-set from a group of predetermined weight sets;
determining a measurement probability for the initial weight-set from measurements of a current time-slot;
determining a transition probability for the initial weight-set, the transition probability based at least on a change from a previously requested weight-set;
calculating a weight-set metric for the initial weight-set based at least on the measurement probability, the transition probability, and a prior weight-set metric; and
detecting a final weight-set from the group of predetermined weight-sets based at least on the weight-set metric to process the current time-slot.

20. The machine readable medium of claim 19 wherein the weight-set metric is a weight-set metric for a current node of a trellis of nodes, and wherein calculating the weight-set metric comprises:
calculating, for branches of the trellis leading to the current node, a branch metric based at least on the measurement probability and the transition probability;
calculating node metrics for the current node based at least on the branch metric of a branch leading to the current node and a metric of a prior node connected by the branch leading to the current node; and
selecting a greatest of the node metrics for the current node to correspond with the weight-set metric for the current node.

21. The machine readable medium of claim 19 wherein determining the measurement probability includes determining the measurement probability for each weight-set of the group of predetermined weight-sets based at least on received amplitude and phase measurements of the current time-slot.

22. The machine readable medium of claim 19 wherein determining the measurement probability for the weight-set further comprises estimating a probability for each weight-set of the group of predetermined weight-sets for the current time-slot by measuring received pilot symbols of a dedicated physical channel (DPCH) and a continuous pilot channel (CPICH) of the current time slot.

23. (Original) The machine readable medium of claim 19 wherein the transition probability is determined from a probability that a weight-set was changed from other weight-sets of the group of predetermined weight-sets and based at least on feedback previously provided by a receiver to a transmitter.

24. A code division multiple access (CDMA) receiver comprising:
- a dedicated channel measurement element to measure characteristics of current time slots of a GDMA channel;
- a weight selection element to select an initial weight-set from a group of predetermined weight sets;
- a metrics calculation element to calculate metrics for the initial weight-sets estimated to have been used in transmitting each of the current time slots, the metrics calculated from the measured characteristics of the current time slots;
- a weight detection element to select a final weight-set from the group of predetermined weight-sets based at least on the metrics for the initial weight-sets; and
- a channel tap calculator to generate channel taps from the selected final weight-set.

25. The CDMA receiver of claim 24 wherein the metrics calculation element calculates metrics for the initial weight-sets based at least on a measurement probability for the initial weight-set from the measured characteristics of one of the current time-slots, and
- wherein the metrics calculation element calculates a transition probability for the initial weight-set, based at least on a change from a previously requested weight-set.

26. The CDMA receiver of claim 25 wherein each of the metrics for weight-sets is a weight-set metric for a current node of a trellis of nodes, and wherein the metrics calculation element calculates the metrics for weight-sets by calculating, for branches of the trellis leading to the current node, a branch metric based at least on the measurement and transition probabilities, and calculating node metrics for the current node based at least on the branch metric of a branch leading to the current node and a metric of a prior node connected by the branch leading to the current node, and
- wherein the weight detection element selects a greatest of the node metrics for the current node to correspond with the weight-set metric for the current node.

27. The CDMA receiver of claim 24 further comprising:
- a pilot channel measurement element to measure the CDMA channel; and
- a weight selection element to select a channel weight-set from a pilot channel measurement, wherein the weight selection element provides feedback to a transmitter based at least on the selected channel weight-set for use in subsequent transmissions to the CDMA receiver by the transmitter.

28. The CDMA receiver of claim 24 further comprising:
- despreaders to despread received spread spectrum signals with spreading codes; and
- a rake receiver to weigh and combine multipath components of the received spread spectrum signals using the channel taps provided by the channel tap calculator.

29. The CDMA receiver of claim 24 wherein the dedicated channel measurement element, the metrics calculation element, the weight detection element, and the channel tap calculator are functional elements of a processor.

* * * * *

UNITED STATES PATENT AND TRADEMARK OFFICE
CERTIFICATE OF CORRECTION

PATENT NO.      : 7,065,131 B2
APPLICATION NO. : 10/066274
DATED           : June 20, 2006
INVENTOR(S)     : Bergel It is certified that error appears in the above-identified patent and that said Letters Patent is hereby corrected as shown below:

On the Title Page, Item 56, under "Other Publications", in column 2, line 4, delete "Inc." and insert -- Inc., --, therefor.

On the Title Page, in "Assistant Examiner", in column 2, line 1, delete "Edith Chang" and insert -- Edith M. Chang --, therefor.

In column 8, line 63, in Claim 6, delete "weight sets," and insert -- weight-sets, --, therefor.

In column 9, line 13, in Claim 9, after "that" delete "a".

In column 9, line 37, in Claim 14, delete "weight sets;" and insert -- weight-sets; --, therefor.

In column 9, line 39, in Claim 14, after "for" delete "a".

In column 9, line 57, in Claim 15, delete "probabilitys," and insert -- probability, --, therefor.

In column 10, line 21, in Claim 19, delete "weight sets;" and insert -- weight-sets; --, therefor.

In column 10, line 61, in Claim 22, delete "time slot." and insert -- time-slot. --, therefor.

In column 10, line 62, in Claim 23, delete "(Original)" before "The".

In column 11, line 4, in Claim 24, delete "time slots" and insert -- time-slots --, therefor.

In column 11, line 4, in Claim 24, delete "GDMA" and insert -- CDMA --, therefor.

In column 11, line 7, in Claim 24, delete "weight sets;" and insert -- weight-sets; --, therefor.

In column 11, line 9, in Claim 24, delete "weight-sets;" and insert -- weight-set --, therefor.

In column 11, line 10, in Claim 24, delete "time slots," and insert -- time-slots, --, therefor.

UNITED STATES PATENT AND TRADEMARK OFFICE
CERTIFICATE OF CORRECTION

PATENT NO. : 7,065,131 B2
APPLICATION NO. : 10/066274
DATED : June 20, 2006
INVENTOR(S) : Bergel It is certified that error appears in the above-identified patent and that said Letters Patent is hereby corrected as shown below:

In column 11, line 12, in Claim 24, delete "time slots;" and insert -- time-slots; --, therefor.

In column 11, line 15, in Claim 24, delete "weight-sets;" and insert -- weight-set; --, therefor.

In column 11, lines 19–20, in Claim 25, delete "weight-sets" and insert -- weight-set --, therefor.

In column 11, line 24, in Claim 25, delete "weight-set," and insert -- weight-set --, therefor.

Signed and Sealed this

Fourteenth Day of November, 2006

JON W. DUDAS
*Director of the United States Patent and Trademark Office*